(12) United States Patent
Chapman

(10) Patent No.: US 8,485,740 B1
(45) Date of Patent: Jul. 16, 2013

(54) CAMERA HEAD WITH PAN, ROLL AND TILT MOVEMENT

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 13/527,293

(22) Filed: Jun. 19, 2012

(51) Int. Cl.
*G03B 17/00* (2006.01)
*H04N 5/225* (2006.01)
*H04N 5/232* (2006.01)

(52) U.S. Cl.
USPC ...... 396/428; 396/421; 348/211.14; 348/373; 352/243; 248/183.2; 248/183.4

(58) Field of Classification Search
USPC ............. 396/428, 7, 12, 13, 419, 421, 427; 348/211.14, 373; 352/197, 243; 248/178.1, 248/179.1, 187.1, 183.1, 183.2, 183.3, 183.4, 248/184.1, 186.2
See application file for complete search history.

(56) References Cited

U.S. PATENT DOCUMENTS

| | | | | |
|---|---|---|---|---|
| 2,393,851 A | * | 1/1946 | Wills et al. | 248/179.1 |
| 2,490,628 A | * | 12/1949 | Isserstedt | 318/649 |
| 6,122,102 A | * | 9/2000 | Gehris et al. | 359/429 |
| 6,635,887 B2 | * | 10/2003 | Kwan et al. | 250/491.1 |
| 6,708,943 B2 | * | 3/2004 | Ursan et al. | 248/660 |
| 7,209,176 B2 | | 4/2007 | Chapman | |
| 7,264,220 B2 | * | 9/2007 | Dent et al. | 248/660 |
| 7,588,376 B2 | * | 9/2009 | Friedrich | 396/419 |
| 8,125,564 B2 | | 2/2012 | Kozlov et al. | |
| 8,154,653 B2 | | 4/2012 | Chapman | |
| 2002/0008759 A1 | * | 1/2002 | Hoyos | 348/211 |
| 2009/0207250 A1 | * | 8/2009 | Bennett et al. | 348/144 |
| 2012/0263445 A1 | * | 10/2012 | Beasley | 396/12 |

FOREIGN PATENT DOCUMENTS

WO 2011/140245 A1 11/2011

OTHER PUBLICATIONS

"Scorpio Stabilized Head" information sheet (May 2011).
"Libra Head—3-axis stabilized remote head" information sheet (May 2011).

* cited by examiner

*Primary Examiner* — Rochelle-Ann J Blackman
(74) *Attorney, Agent, or Firm* — Kenneth H. Ohriner; Perkins Coie LLP

(57) ABSTRACT

A remote control and/or gyrostabilized camera head has first and second roll forks attached to a pan frame. Each roll fork has a front roll arm and a back roll arm. A circular roll track segment may be provided on each roll arm. A roll frame has first and second motor supports or housings. A roll motor on or in the first motor support moves the roll frame about a roll axis. A tilt frame is rotatably supported between the first and second motor supports. A tilt motor on or in the second motor support rotates the tilt frame about a tilt axis. The weight of the roll motor support and the roll motor may be substantially the same as the tilt motor support and the tilt motor, so that the roll frame is balanced, allowing for better performance. As the camera head is a pan/roll/tilt head, the head can continue to provide movement in three axes, regardless of the camera position.

13 Claims, 2 Drawing Sheets

CAMERA HEAD WITH PAN, ROLL AND TILT MOVEMENT

BACKGROUND OF THE INVENTION

In motion picture, television or video filming or recording, the camera is often supported on a vehicle, to follow an action or moving sequence, or to achieve a desired camera angle or effect. Various specialized camera cars, camera trucks, cranes, and dollies have been used for this purpose. Generally, although the camera may be moving, it is important for the camera to be maintained in a steady or stable position.

For example, with a camera mounted on a camera crane moving along a roadway and filming or recording a fixed subject on the ground, e.g., a building, or a subject which is also moving e.g., another moving vehicle, the camera and the lens of the camera will necessarily move in unintended and undesirable ways, due to various factors. These factors may include changes in the roadway direction or inclination, changes in the vehicle orientation, due to shifting gravitational or inertial loads, wind forces, as well as for other reasons. The undesirable camera lens movement resulting from these factors reduces the quality of the filmed or recorded images, by causing the images to be improperly framed, or to appear jumpy or erratic.

To reduce or eliminate undesirable lens movement, various camera platform or camera head stabilization systems have been proposed. Generally, these systems sense undesired lens movement. A computer controller then operates electric motors linked to the camera platform. The electric motors move the platform to try to cancel out the undesired lens movement and keep the lens steady and aimed as desired.

A remote control camera head allows the camera to be moved, aimed, or controlled from a remote location (i.e., a location not immediately behind the camera). Typically, a remote camera head is mounted on a camera crane. The crane can move the camera head, and the camera on the head, into locations not accessible using conventional camera operations (i.e., with a camera operator behind the camera and controlling camera movement by hand). For example, a camera on a camera head may be suspended on a crane arm extending out over the side of a tall building, a cliff, a waterfall, etc., i.e., in a position where it would be unsafe, impractical, or impossible to perform conventional camera operations.

In general, remote camera head operations involve placing the camera on a remote camera head which can perform pivoting or rotational movement in three axes, known as pan, tilt, and roll. Electric motors on or in the remote camera head are remotely controlled (via cables or wireless links) by a camera head operator, typically on the ground, or on the vehicle supporting the crane arm. Operation of the camera itself is similarly remotely controlled. The electric motors may also be linked to a stabilization system, as described above, so that steady and accurate aiming of the camera is not disturbed by undesired movements.

Many camera heads are relatively difficult and time consuming to set up, balance, operate, or reconfigure. Since production time can be extremely expensive, even short delays associated with use of a camera head can be disadvantageous. Consequently, there is a need for a camera head which can be quickly and easily set up for use.

While existing camera stabilization systems and camera heads have met with varying degrees of success, various engineering challenges remain in designing improved camera stabilization systems and camera heads.

SUMMARY OF THE INVENTION

In a new camera head, first and second roll forks are attached to a pan frame, with each roll fork having a front roll arm and a back roll arm. A circular roll track segment may be provided on each roll arm. A roll frame has first and second motor supports or housings. A roll motor on or in the first motor support moves the roll frame about a roll axis. A tilt frame is rotatably supported between the first and second motor supports. A tilt motor on or in the second motor support rotates the tilt frame about a tilt axis. The weight of the roll motor support and the roll motor may be substantially the same as the tilt motor support and the tilt motor, so that the roll frame is balanced, allowing for better performance. As the camera head is a pan/roll/tilt head, the head can continue to provide movement in three axes, regardless of the camera position.

BRIEF DESCRIPTION OF THE DRAWINGS

In the drawings, the same reference number indicates the same element in each of the views.

DETAILED DESCRIPTION

Figure 1:
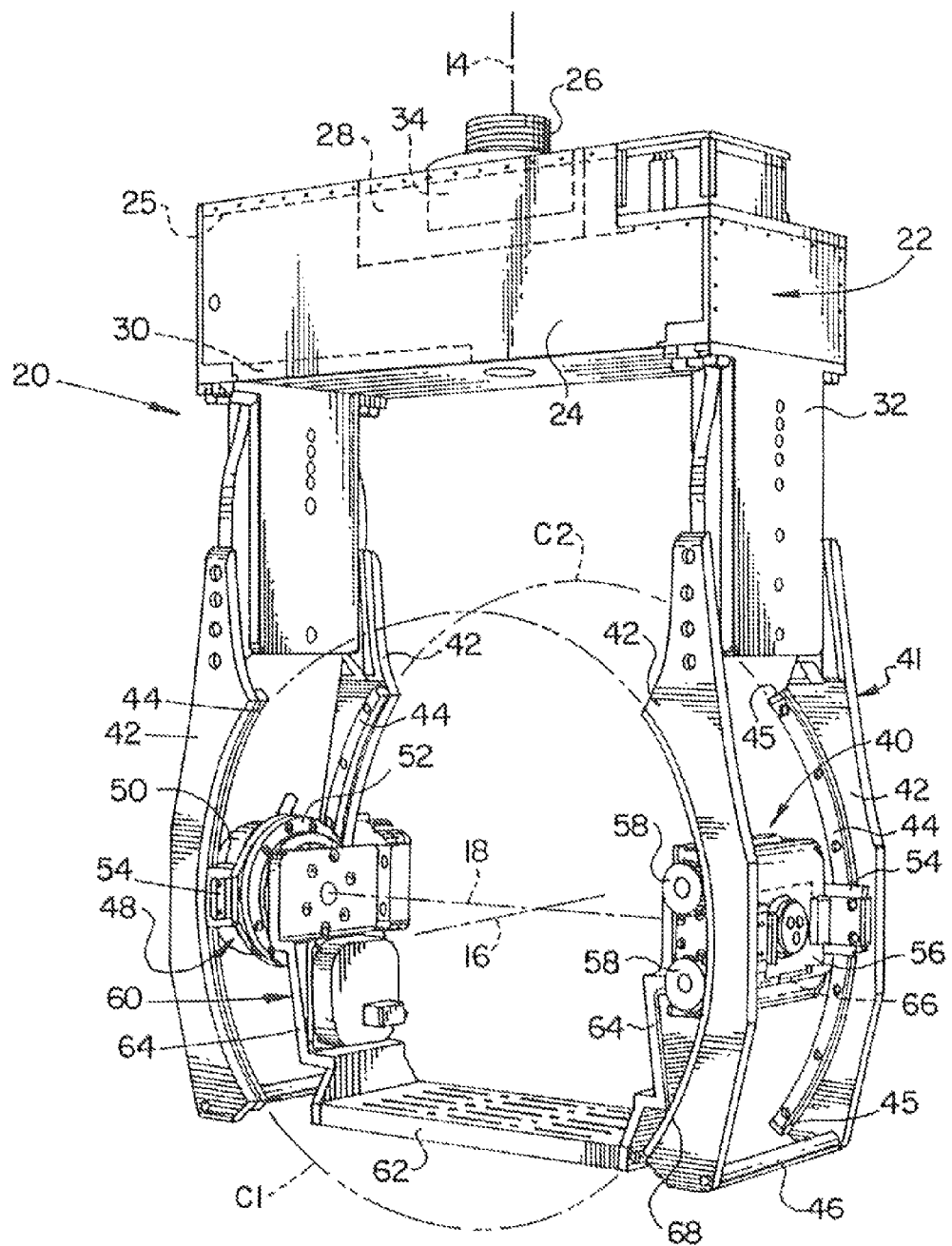
FIG. 1 is a perspective view of a new camera head in a home or initial set up position.
Figure 2:
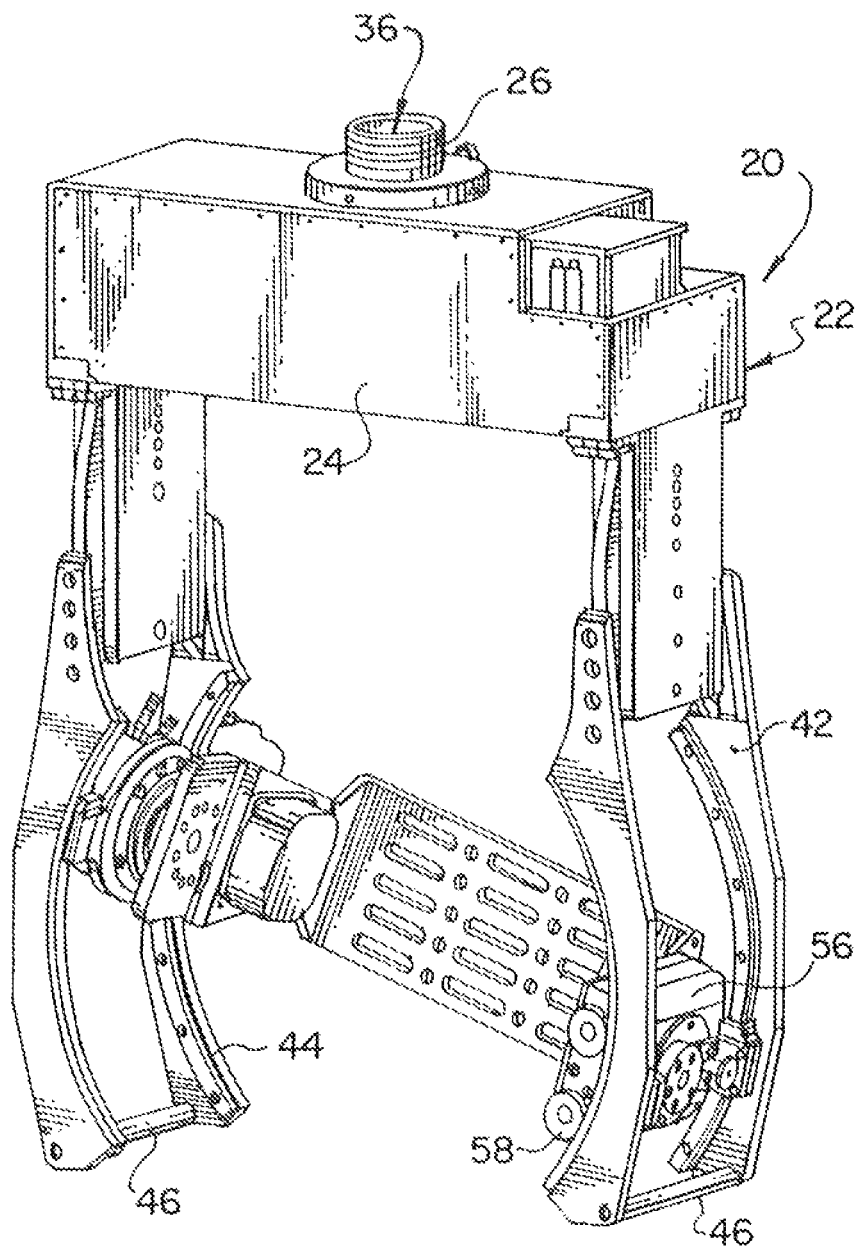
FIG. 2 is a perspective view of the camera head of FIG. 1 with the roll and tilt frames moved into non-zero angle positions.

As shown in FIGS. 1 and 2, a camera head 20 has a pan frame 22 that may include an enclosure or housing 24. A head attachment fitting 26 is attached to pan frame 22 at a central location. The head attachment fitting 22 may be a large diameter hollow threaded stud. The head attachment fitting 22 is used to attach the head onto a camera crane, as described for example in U.S. Pat. No. 8,033,742, incorporated herein by reference. A pan motor 34 on or in the pan frame 22 rotates the pan frame 22 about the attachment fitting 26. The pan motor 34 may be a brushless, slot-less electric motor that rotates the pan frame via a harmonic drive 28. In the example shown, a 24 VDC motor is used. The harmonic drive 28, if used, allows for smooth and quiet gear reduction. The slot-less motor avoids jerking movements when the pan motor 34 operates at low speeds. The fitting 36 and the pan motor 34 may have aligned through holes 36, to allow electrical cables to centrally feed through the pan frame. This allows the head 20 to rotate about the pan axis 14 without winding up the cables. Electronic components and circuitry 30 may be included within the enclosure 24. The circuitry 30 may provide for remote control or gyro-stabilization functions, for example as described in U.S. Pat. No. 8,100,591 or U.S. Patent Application No. 2005/0052531, incorporated herein by reference. Although the drawings show a pan frame 22 having an enclosure 24, the enclosure 24 may be omitted.

Side arms 32 may be provided at opposite ends of the pan frame 22. The side arms 32, if used, may extend in a direction parallel to the pan axis 14, with the side arms perpendicular to the enclosure 24, or to a mounting plate 25 supporting the attachment fitting 26 if no enclosure is used. Roll forks 41 are attached at the lower ends of the side arms 32, or directly to the enclosure 24 or the mounting plate 25. The vertical position of the roll forks 41 (i.e., the position in the direction parallel to the pan axis 14) may be adjustable via use of alternative bolt holes, slotted or sliding fittings, etc.

The roll forks 41 comprise front and back roll arms 42, which may be mirror images of each other. The front and back roll arms 42 on the left side of the camera head 20 as shown in FIG. 1 may also be mirror images of the front and back roll arms 42 on the right side of the camera head. Roll tracks 44 are attached at the inner edges of the roll arms 42. The roll tracks 44 and optionally the inner edges of the roll arms 42 have a circular curvature so that they are coincident with front and back imaginary circles C1 and C2. The diameter of the circles may be selected depending on the size of the camera to mounted on the head 20. For example, for an average size camera, C1 and C2, and the matching curvature of the tracks, may be 18-22 cm, while for a large camera it may be 25-35 cm. The circles C1 and C2 are coaxially aligned with each other and have the same diameter. Arm bars 46 may be provided at the lower end of each roll fork 41 to attach the lower ends the roll arms 42 together. The components described above are rigidly connected together and together form a pan frame 22. The pan frame 22 is highly rigid yet lightweight, since the roll arms 42 are spaced apart in the front-back direction to provide a high moment of inertia which resists bending.

A roll frame 40 generally indicated at 40 rotate about a roll axis 16 within the pan frame 22. The roll frame 40 includes all of the components that rotate together about the roll axis 16. Specifically, these include a first motor housing or motor support 48 having track slides or rollers 54 which slide or roll on the roll tracks 44 of the first roll fork 41 (on the left side of FIG. 1.) Similarly, a second motor housing or motor support 56 has track slides or rollers which slide or roll on the roll tracks 44 on the second roll fork 41 (on the right side of FIG. 1). A tilt motor 50 is attached to the first motor support 56 and a roll motor 66 is attached to the second motor support 56. The roll motor 66 drives gears or sprockets 58 which mesh with a rack 68 on one or both of the roll arms 42 on the right side roll fork 41. The gears 58 may be preloaded in opposite directions to reduce or avoid backlash. Mechanical stops 45 are provided at the ends of the tracks.

Movement of the roll frame 40 is limited by the arc subtended by the roll tracks 44. In the design shown, an arc of about 60 degrees is used, allowing the roll frame to move +/−about 30 degrees from horizontal. In principle, the roll arms 42 may be replaced by entire roll rings or circles to allow for further roll axis movement. However, generally roll axis movement beyond the 60 degree range shown in FIG. 1 is not needed.

A tilt frame 60 is rotatably supported within, and also forms part of, the roll frame 40. The tilt frame 60 includes left and right side arms 64 attached to a camera platform 62. The left side arm 64 is rotatably supported on the first or left side motor support 48. The right side arm 64 is rotatably supported on the second or right side motor support 56. The length of the side arms 64 may be adjustable, for example by using slotted fittings, pins and hole arrays, etc., to better allow the center of gravity of the payload (i.e., the camera and any accessories on the camera or on the camera platform) to be aligned on the tilt axis. The shaft of the tilt motor 50 is attached to the left side arm 64, so that actuation of the tilt motor rotates the tilt frame about a tilt axis 18.

Referring to FIG. 1, to reduce the rotational moment of inertia of the head 20 about the roll axis 16, the roll frame 40 may be designed so that the center of gravity of the roll frame 40 is close to or centered on the roll axis. The center of gravity of the pan frame and the tilt frame may similarly be aligned on the pan axis and the tilt axis.

The tilt frame may be substantially balanced, with a center of gravity at the center of the camera platform, equidistant from the left and right roll forks 41. This may be achieved by designing the motor support 52 and the motor 50 to have the same weight, within 20%, 10% or 5%, as the motor support 56 and the motor 66. If the roll frame 40 is balanced, the head's performance may be improved as there is less unbalanced weight for the roll motor 56 to move. With the head 20 designed to be inherently balanced about the pan, roll and/or tilt axes, after the camera is mounted on the camera platform, fewer if any counterweights are needed. This reduces the overall load on the crane arm supporting the head 20, as well as the payload on the head, resulting in improved performance.

The power and control wiring connecting to the pan, roll and tilt motors is omitted from the drawings for purpose of illustration. Each of the pan, roll and tilt motors may be a brushless and slot-less 24 VDC motor that drives the pan, roll and tilt frames respectively through a harmonic drive gear reduction. The head fitting 26 may advantageously be provided as a 2-4 inch threaded stud having a large diameter through hole 36 aligned with a through hole or opening in the pan motor 34. This allows electrical cables from power supplies and controllers used with the camera crane to connect to the camera, without the cables winding up as the head is rotated about the pan axis 14.

In use, the camera and any accessories used (together forming the payload) are attached onto the camera platform 62. The center of gravity of the payload may be positioned laterally on the camera platform so that it is aligned on the pan axis, to minimize the rotational moment of inertia of the payload about the pan axis 14. Slotted holes may be provided in the camera platform 62 for this purpose. The center of gravity of the payload may be vertically aligned onto the tilt axis 18 for the same purpose, by raising or lowering the camera platform 62 on the arms 64, using slotted holes, or patterns of positioning holes, as described in U.S. Pat. No. 8,154,653 and PCT/US2011/035227, incorporated herein by reference. Similarly, the center of gravity of the payload may also be aligned on the tilt axis. Aligning the payload as described allows the head to more quickly position the camera as desired.

With the camera now mounted onto the head, the head may be controlled remotely to aim the camera as desired, using known controlling techniques. Similarly, the head 20 may include sensors and circuitry to allow for gyro-stabilization, also using known techniques. With the camera head 20 the roll frame 40 is supported directly on the pan frame 22. As a result, even when the camera is aimed straight down, the head 20 can still provide movement in three axes. Specifically, when the lens is aimed straight down, the pan axis 14 becomes the roll axis, and the roll axis 16 becomes the pan axis. In contrast, with known camera heads where the tilt frame is supported directly on the pan frame, an axis of movement is lost when the camera is aimed straight down, since the roll and pan axes coincide.

The front to back dimension or depth of the camera head 20 may be less than 12, 10 or 8 inches, providing a low profile. The side-to-side width of the camera head may be less than 24, 20 or 18 inches. With the camera head 20 having compact dimensions, the head may be more easily positioned through small openings, such as windows or doorways, and the head may also be used in cramped spaces. The camera head 20 may be attached onto a camera crane in an underslung position, with the attachment fitting 26 on top, or overslung, with the attachment fitting 26 at the bottom of the head.

Thus, a novel camera head has been shown and described. Various changes and substitutions may of course be made without departing from the spirit and scope of the invention. The invention, therefore, should not be limited except by the following claims and their equivalents.

The invention claimed is:

1. A camera head comprising:
a pan frame;
first and second roll forks attached to the pan frame, with each roll fork having a front roll arm and a back roll arm;
a circular roll track segment on each roll arm, with the track segments on the front roll arms aligned on a front circle and with the track segments on the back track segments aligned on a back circle concentric and parallel to the front circle;
a roll frame having first and second motor supports;
a roll motor on or in the first motor support for moving the roll frame within the first and second roll forks about a roll axis;
a tilt frame rotatably supported between the first and second motor supports; and
a tilt motor on or in the second motor support for rotating the tilt frame about a tilt axis.

2. The camera head of claim 1 further including track slides on the first and second motor supports, with the track slides attached to the track segments.

3. The camera head of claim 1 with the roll motor having a shaft attached to a gear or sprocket engaged with a rack one of the roll arms.

4. The camera head of claim 1 further including a head attachment fitting on the pan frame and a pan motor on or in the pan frame for rotating the pan frame about the head fitting.

5. The camera head of claim 1 with the head attachment fitting and the pan motor each having a central through hole having a diameter of at least two inches.

6. The camera head of claim 1 with the tilt frame tiltable relative to the pan frame by at least 360 degrees.

7. A camera head comprising:
a pan frame having left and right spaced apart pan arms at opposite ends of an enclosure;
first and second left roll arms on the left pan arm;
first and second right roll arms on the right pan arm;
a circular segment roll axis track on an inside edge of each roll arm;
a roll frame supported on the roll axis tracks, with the roll frame including:
left and right motor supports;
a roll axis motor on or in the left motor support connected to one or more gears or sprockets meshed with a rack on a left pan arm;
a tilt axis motor on or in the right motor support;
one or more track slides on the right motor support engaged to the roll axis tracks on right pan arms;
a tilt frame having a camera platform, with a right side of the tilt frame attached to the tilt axis motor, and with a left side of the tilt frame rotatably supported by the left motor support.

8. The camera head of claim 7 with roll frame having a center of gravity substantially at a centerline of the camera platform.

9. The camera head of claim 7 with the sum of the weight of the left motor support, the roll axis motor and the gears or sprockets within 20% of the sum of the weight of the right motor support and the tilt axis motor.

10. The camera head of claim 7 with the roll axis tracks subtending an arc of 25 to 45 degrees.

11. The camera head of claim 7 with the tilt frame tiltable relative to the pan frame by at least 360 degrees.

12. The camera head of claim 7 further comprising one or more track slides on the left motor support engaged to the roll axis tracks on left pan arms.

13. The camera head of claim 7 with the roll axis motor connected to one or more gears or sprockets meshed with a first rack on first left pan arm, and with the roll axis motor also connected to one or more gears or sprockets meshed with a second rack on the second left pan arm.

* * * * *